United States Patent
Nagata

(10) Patent No.: US 9,645,567 B2
(45) Date of Patent: May 9, 2017

(54) DATA SETTING DEVICE

(75) Inventor: Yuta Nagata, Shiga (JP)

(73) Assignee: OMRON CORPORATION, Kyoto (JP)

( * ) Notice: Subject to any disclaimer, the term of this patent is extended or adjusted under 35 U.S.C. 154(b) by 537 days.

(21) Appl. No.: 14/373,960

(22) PCT Filed: Mar. 2, 2012

(86) PCT No.: PCT/JP2012/055405
§ 371 (c)(1),
(2), (4) Date: Jul. 23, 2014

(87) PCT Pub. No.: WO2013/111351
PCT Pub. Date: Aug. 1, 2013

(65) Prior Publication Data
US 2015/0073569 A1  Mar. 12, 2015

(30) Foreign Application Priority Data

Jan. 24, 2012  (JP) ................................. 2012-012460

(51) Int. Cl.
*H04L 12/403* (2006.01)
*G05B 19/05* (2006.01)
*H04L 12/40* (2006.01)

(52) U.S. Cl.
CPC ......... *G05B 19/056* (2013.01); *G05B 19/054* (2013.01); *H04L 12/4035* (2013.01);
(Continued)

(58) Field of Classification Search
None
See application file for complete search history.

(56) References Cited

U.S. PATENT DOCUMENTS 5,522,053 A * 5/1996 Yoshida ................... G06F 9/38
711/213
6,684,110 B1 * 1/2004 Kutsuna ................ G05B 15/02
700/17
(Continued)

FOREIGN PATENT DOCUMENTS

JP  63-164548  7/1988
JP  2001-313675  11/2001
(Continued)

OTHER PUBLICATIONS

Darpa Interner Programm: "RFC 793—Transmission Control Protocol", Sep. 1, 1981, XP055274453, URL:https://tools.ietf.org/html/rfc793.
(Continued)

*Primary Examiner* — Isaac T Tecklu
(74) *Attorney, Agent, or Firm* — Greenblum & Bernstein, P.L.C.

(57) ABSTRACT

In one aspect of the present invention, data to be written is divided into a plurality of pieces of divided data of a maximum size or less to calculate an offset of each piece of divided data, a frame issuing an instruction to a PLC to write a predetermined terminal code in a head address of a data area is transmitted, a frame issuing an instruction to the PLC to write the divided data at a position of the corresponding offset from the head address of the data area with respect to the divided data except a head divided data is transmitted, and a frame issuing an instruction to the PLC to write the head divided data in the head address of the data area is transmitted.

10 Claims, 4 Drawing Sheets

(52) U.S. Cl.
CPC ............ *H04L 12/40169* (2013.01); *G05B 2219/13004* (2013.01); *H04L 2012/4026* (2013.01)

(56) References Cited

U.S. PATENT DOCUMENTS

| | | | |
|---|---|---|---|
| 6,934,288 B2 | 8/2005 | Dempo et al. | |
| 7,725,528 B1* | 5/2010 | Zink | G05B 19/054 709/203 |
| 2001/0036185 A1* | 11/2001 | Dempo | H04L 29/06 370/392 |
| 2005/0187988 A1* | 8/2005 | Fulton | G05B 19/054 |
| 2006/0056410 A1* | 3/2006 | Kawashima | H04L 1/0083 370/389 |
| 2006/0098686 A1* | 5/2006 | Takakuwa | H04J 3/1658 370/470 |
| 2007/0242745 A1* | 10/2007 | Choi | H04B 3/54 375/240 |
| 2009/0180465 A1* | 7/2009 | Closset | H04L 12/4035 370/350 |
| 2011/0292837 A1* | 12/2011 | Nakamura | H04L 12/2602 370/256 |
| 2012/0106387 A1* | 5/2012 | Nakamura | H04L 12/4035 370/252 |
| 2012/0151878 A1* | 6/2012 | Biehler | G05B 19/4186 53/443 |
| 2012/0155493 A1* | 6/2012 | Biehler | H04L 12/4035 370/474 |
| 2012/0179849 A1* | 7/2012 | Mizutani | G05B 19/054 710/110 |
| 2012/0327770 A1* | 12/2012 | Vijayasankar | H04L 47/127 370/235 |
| 2013/0070783 A1* | 3/2013 | Vermeulen | H04L 47/50 370/458 |
| 2013/0204450 A1* | 8/2013 | Kagan | H04L 67/06 700/291 |
| 2014/0369179 A1* | 12/2014 | Ueda | H04L 45/00 370/217 |
| 2015/0026381 A1* | 1/2015 | Ham | G06F 13/4027 710/308 |

FOREIGN PATENT DOCUMENTS

| | | |
|---|---|---|
| JP | 2010-049543 | 3/2010 |
| JP | 2011-24156 | 2/2011 |

OTHER PUBLICATIONS

Office Action issued in European Patent Office (EPO) Counterpart Patent Appl. No. 12866546.0, dated Sep. 9, 2016.
Search Report issued in European Patent Office (EPO) Patent Application No. 12866546.0, dated Jul. 6, 2015.
Search report from PCT/JP2012/055405, mail date is Mar. 27, 2012.

\* cited by examiner

FIG. 4A

Data to be written

Header | A | B | C | D | E | F | G | null
       | 41| 42| 43| 44| 45| 46| 47| 00

FIG. 4B

Frame transmitted from computer to PLC | Memory state of PLC
---|---

Initial state: memory state is recognized as "123456"

| 1 | 2 | 3 | 4 | 5 | 6 | null | null | null |
|---|---|---|---|---|---|------|------|------|
| 31| 32| 33| 34| 35| 36| 00   | 00   | 00   |

Variable abc

First frame — Size of 1 byte, Offset of 3 byte

Header | null
       | 00

After one frame is written: memory state is recognized as empty (null)

| null | 2 | 3 | 4 | 5 | 6 | null | null | null |
|------|---|---|---|---|---|------|------|------|
| 00   | 32| 33| 34| 35| 36| 00   | 00   | 00   |

Variable abc

Second frames — Size of 5 byte, Offset of 3 byte

Header | D | E | F | G | null
       | 44| 45| 46| 47| 00

After two frames are written: memory state is recognized as empty (null)

| null | 2 | 3 | D | E | F | G | null | null | null |
|------|---|---|---|---|---|---|------|------|------|
| 00   | 32| 33| 44| 45| 46| 47| 00   | 00   | 00   |

Variable abc

Third frames — Size of 3 byte, Offset of 0 byte

Header | A | B | C
       | 41| 42| 43

After three frames are written: memory state is recognized as "ABCDEFG"

| A | B | C | D | E | F | G | null | null | null |
|---|---|---|---|---|---|---|------|------|------|
| 41| 42| 43| 44| 45| 46| 47| 00   | 00   | 00   |

Variable abc

FIG. 5A

Data to be written

Header | A | B | C | D | E | F | G | null
| 41 | 42 | 43 | 44 | 45 | 46 | 47 | 00

FIG. 5B

Frame transmitted from computer to PLC | Memory state of PLC

First frame

Size of 5 byte, Offset of 0 byte

Header | A | B | C | D | E
| 41 | 42 | 43 | 44 | 45

Second frames

Size of 3 byte, Offset of 5 byte

Header | F | G | null
| 46 | 47 | 00

Variable abc

Initial state: memory state is recognized as "123456"

| 1 | 2 | 3 | 4 | 5 | 6 | null | null | null | null |
| 31 | 32 | 33 | 34 | 35 | 36 | 00 | 00 | 00 | 00 |

Variable abc

After one frame is written: memory state is recognized as "ABCDE6" ← improper data

| A | B | C | D | E | 6 | null | null | null | null |
| 41 | 42 | 43 | 44 | 45 | 36 | 00 | 00 | 00 | 00 |

Variable abc

After two frames are written: memory state is recognized as "ABCDEFG"

| A | B | C | D | E | F | G | null | null | null |
| 41 | 42 | 43 | 44 | 45 | 46 | 47 | 00 | 00 | 00 |

DATA SETTING DEVICE

FIELD

The present invention relates to a technology of rewriting a variable set in a PLC through a network.

BACKGROUND

In FA (Factory Automation), an industrial network system controls production facilities. In the industrial network system, a plurality of slave devices which perform control of various production facilities and data collection and a master device (PLC: Programmable Logic Controller) that centrally controls the slave devices are connected to each other through a control-system network (field network). The PLC installed in a production line or a production site is connected to a host computer through an information-system network, and a system manager or an engineer can perform state monitoring or maintenance of each industrial network system with the computer.

In a specification of a general PLC, pieces of information used in a ladder program and the like are stored as setting variables in a memory, and the setting variables are rewritten from an external computer, which allows change or correction (debugging) of operation of the PLC. A data type of the setting variable is roughly classified into a fixed-length data type such as an int type (integer type) and a real type and a variable-length data type such as a string type (character string type). In the conventional PLC, an upper limit size of the variable-length data such as the string type is restricted to a relatively small value (for example, 256 bytes).

One of the reasons the upper limit size is restricted is a constraint of a maximum frame length (a frame size transmittable in one-time data transmission) in the industrial network. There are various standards in the industrial network. For example, the maximum frame length is as quite small as about 500 bytes in DeviceNet or CompoNet that is a typical control-system network. In the restriction, it is necessary to read or rewrite the setting variable from the external computer. Therefore, as described above, it is necessary to restrict the upper limit size to about 256 bytes.

Conventionally, the restriction hardly becomes troublesome because the variable exceeding 256 bytes is not originally intended to be dealt with by the PLC. Nowadays, with the progress of a function of the PLC, there is emerging a need to provide the setting variable of several kilobytes to several megabytes in the PLC to perform higher-level processing or flexible processing. Although extension is relatively easily performed on the PLC side, actually the maximum frame length that is of the network standard is hardly extended. Accordingly, a mechanism to transmit and receive large-size data is required in a framework of the existing industrial network.

In the framework (IP fragmentation) of general TCP/IP communication, in the case that a size of an IP packet exceeds an MTU (Maximum Transmission Unit), the IP packet is transmitted while divided into a plurality of packets, the individually-received packets are combined to restore the original packet on the reception side based on header information (for example, see Japanese Unexamined Patent Publication No. 2001-313675). However, the fragmentation framework is not prepared for a protocol (for example, CIP (Common Industrial Protocol)) generally used in the industrial network.

When the variable having the size larger than the maximum frame length is rewritten from the external computer, it is necessary to adopt a method of transmitting the data while dividing the data into a plurality of frames. In this case, the variable in a memory is safely overwritten through a procedure in which the variable is overwritten after the original data is restored on the PLC side by combining the pieces of data received multiple times. However, the procedure is hardly employed on the protocol for the industrial network. The protocol for the industrial network is designed with more emphasis on a real-time property and transmission efficiency, but the protocol for the industrial network does not include the framework like session management in terms of TCP/IP. Therefore, whether all the pieces of divided data are unmistakably received on the PLC side cannot be determined or guaranteed.

For this reason, the inventor tries a procedure, in which the divided data is transmitted to the PLC with an offset (an address from a head of the variable) and the data is sequentially written in a variable area of the memory on the PLC side every time the data is received. FIG. 5 illustrates an example of the procedure. FIG. 5A illustrates the data written in the PLC, and FIG. 5B illustrates the frame transmitted from the computer and s memory state of the PLC in time series. The procedure to set a character string "ABCDEFG" to a variable "abc" is illustrated in FIG. 5. It is assumed that the data size transmittable in one frame is 5 bytes. It is assumed that 10 bytes are assigned as the data area for the variable "abc" to the memory of the PLC, and it is assumed that the a character string "123456" is stored in an initial state.

As illustrated in FIG. 5A, the write data is the string type data, and the write data is constructed with 8 bytes of character codes "41, 42, 43, 44, 45, 46, and 47" of each of "A, B, C, D, E, F, and G" and a null code "00" of a terminal character. The write data is transmitted in twice because only 5 bytes can be transmitted in one frame. In the first frame, 5-byte data (codes of five characters "ABCDE") from the head is transmitted together with an offset "0". When receiving the frame, the PLC writes the character codes of "ABCDE" in the address of the offset "0" of the variable "abc". In the second frame the remaining 3-byte data (the character codes of "FG" and the code of the terminal character) is transmitted together with the offset "5". When receiving the frame, the PLC writes the character codes of "FG" and the code of the terminal character in the address of the offset "5" of the variable "abc". Therefore, the rewrite of the setting variable in the memory of the PLC is completed.

Advantageously the procedure in FIG. 5 is simple, and the procedure is easily employed on the industrial network. However, in the procedure in FIG. 5, there is a risk of generating the following problem. As can be seen from FIG. 5B, the data area of the variable "abc" of the PLC becomes a state "ABCDE6" in a transition period until the data of the second frame is written since the data of the first frame is written. Although the character string "ABCDE6" is improper data, the character string "ABCDE6" is pursuant to a string type data structure. Therefore, whether the data is improper cannot be determined on the PLC side. In the case that processing in which control program operating on the PLC refers to the variable "abc" is generated during the transition period, a malfunction (unintended operation) of the PLC is possibly generated. In the production site, frequently it is necessary to change or correct the setting variable on line without stopping the operation of the PLC. Accordingly, it is necessary to minimize a risk that the PLC generates the malfunction using the partially-written data. In this case, the string type data is described by way of example. However, the similar problem is possibly generated in the case that variable-length data terminated by a predetermined terminal code is written in the PLC.

SUMMARY

To solve the problem, an object of the invention is to provide a technology of simply and safely writing the variable-length data in the PLC.

To achieve the object the invention is summarized as follows. A terminal code is written in a head of a data area of a PLC, and head data is finally written after all pieces of data except the head data are sequentially written, whereby the data area is recognized as empty data during a transition period.

Specifically, according to one aspect of the invention, a data setting device configured to rewrite a variable set in a PLC through a network, the data setting device includes a data setting section configured to generates a frame, and to cause the PLC to rewrite a rewriting target variable by transmitting the frame to the PLC, the frame indicating at least the rewriting target variable, an offset from a head address of a data area of the rewriting target variable, and data to be written at a position designated by the offset. In the data setting device, when the rewriting target variable is a variable-length data type variable terminated by a predetermined terminal code, and when a whole size of the data to be written in the variable exceeds a maximum size transmittable in one frame, the data setting section divides the data to be written into a plurality of pieces of divided data of the maximum size or less to calculate the offset of each piece of divided data, transmits a frame issuing an instruction to the PLC to write the predetermined terminal code in the head address of the data area, transmits a frame issuing an instruction to the PLC to write the divided data at a position of the corresponding offset from the head address of the data area with respect to the divided data except a head divided data, and transmits a frame issuing an instruction to the PLC to write the head divided data in the head address of the data area.

According to the configuration, a state in which the terminal data is set to the head address of the data area is maintained during a transition period of the data write, namely, until the write of the final divided data is completed since the data write is started. Accordingly, even if the PLC refers to the variable during the transition period, the PLC recognizes that the variable is empty (the data is not set). For the empty variable, although the operation depends on design of the PLC, at least abnormal operation (unintended operation) caused by improper data can be prevented before it happens.

The abnormal operation is prevented during the transition period of the data write, so that the data setting section can safely rewrite the variable during the operation of the PLC. At this point, the variable may be a character string type variable terminated by a null code. The network may be an industrial network, and a protocol used to transmit the frame may be a protocol including no fragmentation mechanism. The invention in which rewrite is performed by the division transmission can preferably be applied to the industrial network because the maximum size transmittable in one frame is relatively small in the industrial network.

The invention can also be identified as a data setting device including at least a part of the data setting section, or identified as a data setting system including the data setting device and the PLC. The invention can also be identified as a data setting method in which a computer performs at least a part of the pieces of processing, identified as a program causing the computer to perform at least a part of the pieces of processing, or identified as a computer-readable storage medium in which the program is stored. The pieces of processing and the sections can freely be combined as long as technical inconsistency is generated.

According to the invention, the variable-length data can simply and safely be written in the PLC.

BRIEF DESCRIPTION OF THE DRAWINGS

FIGS. 4A and 4B are views illustrating the procedure to rewrite the string type variable in the embodiment; and FIGS. 5A and 5B are views illustrating a problem of the invention.

DETAILED DESCRIPTION

Hereinafter, an exemplary embodiment of the invention will be described with reference to the drawings. In the following embodiment, by way of example, the string type variable is rewritten using message communication of CIP between a computer (data setting device) and the PLC that are connected to each other through EtherNet/IP. However, the invention is not limited to the embodiment. The invention can preferably be applied irrespective of the network, the protocol, and the data type as long as a variable-length data type variable terminated by a predetermined terminal code is rewritten through the network. However, the upper limit of the transmittable frame size is small in the special-field network such as the industrial network, and the special-field network does not include a mechanism of session management or fragmentation. Therefore, the invention can preferably be applied to the special-field network.

(System Configuration)

A configuration example of an industrial network system will be described with reference to FIG. 1.

Figure 1:
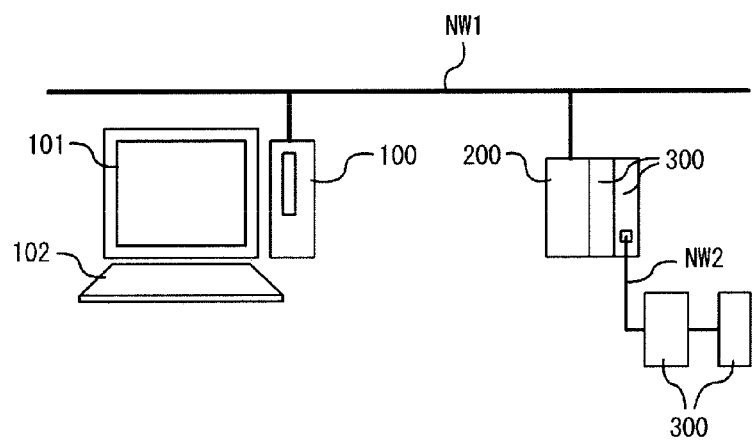
FIG. 1 illustrates a configuration example of an industrial network system.

The industrial network system in FIG. 1 includes a PLC (Programmable Logic Controller) 200 and a plurality of slave devices 300. The PLC 200 and the slave device 300 are connected to each other through a control-system network NW2 or an internal bus. Examples of the slave devices 300 include a power supply unit, a motor unit, a counter unit, an image unit, a communication unit, and an I/O unit. The industrial network system is used to control of various production facilities (such as motors, robots, and sensors) and collect various pieces of data in a production line of a factory.

The PLC 200 is connected to a computer 100 through an information-system network NW1. For example, the computer 100 is used when a system manager monitors a state of each base or when an engineer performs online maintenance of the PLC 200 or the slave device 300. A general-purpose personal computer including a display device 101 and an input device 102 can be used as the computer 100. A CPU executes a program stored in a storage device of the computer 100, thereby implementing a later-described function (data setting section) of reading/writing of a PLC setting variable.

(Read/Write of PLC Setting Variable)

Various pieces of information used in a control program such as a ladder program are stored as setting variables in a memory of the PLC 200, and the setting variables are written or rewritten from the computer 100, which allows change or correction (debugging) of operation of the PLC 200 or the slave device 300.

Examples of the data types of the setting variables include a boolean type (logic type), an int type (integer type), a real type, a byte type, a word type, and a string type (character string type). The pieces of data of the boolean type, the Int type, the real type, the byte type, and the word type are fixed lengths, and the boolean type, the Int type, the real type, the byte type, and the word type have data sizes of 1 byte, 2 bytes, 4 bytes, 1 byte, and 2 bytes, respectively. On the other hand, the data of the string type is a variable length, and the string type has the data size up to 1986 bytes. A character string terminated by a null character (terminal code) is stored in the string type variable. For example, the data having about 660 characters can be set to the string type variable for a 3-byte character like Japanese, and the data having about 500 characters can be set to the string type variable for a 4-byte character like Chinese. This specification is illustrated by way of example, and a variable-length data type having the data size of several kilobytes to several megabytes can also be provided.

Figure 2:
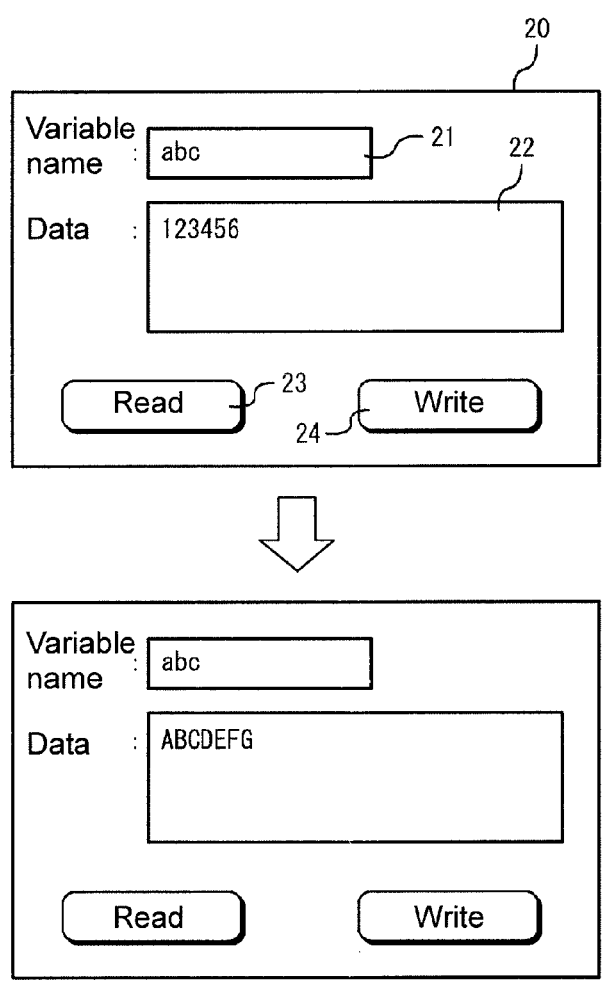
FIG. 2 illustrates an example of an operation screen used to issue an instruction to read/write a PLC setting variable.

FIG. 2 illustrates an example of an operation screen for a function of reading/writing a PLC setting variable, and the operation screen is provided by an application program (tool) operating on the computer 100. For example, when the target PLC is designated to start up the function, an operation screen 20 in FIG. 2 is displayed on the display device 101. When a user inputs a variable name to a box 21 to press a read button 23, the computer 100 acquires a present value of the variable from the PLC 200 and displays the present value in the box 22. An upper stage of FIG. 2 illustrates an example in which a present value "123456" of a variable "abc" is checked. In the case that the value of the variable is written in the PLC 200, the variable name is input to the box 21, the data to be written is input to the box 22, and a write button 24 is pressed. Therefore, the computer 100 transmits a request to write the variable to the PLC 200, and the data of the memory is rewritten in the PLC 200. A lower stage of FIG. 2 illustrates an example in which the value of the variable "abc" is rewritten into "ABCDEFG".

In the computer 100 of the embodiment, the variable is written in the PLC 200 using a variable writing request that is of one of services provided by the CIP. A message of the request includes a service ID, a class ID, the variable name, an offset, and the data to be written. The "service ID" and the "class ID" designate variable writing processing. The "variable name" designates the name of the variable that becomes a writing target, and the "offset" designates which byte from a head address of a data area of the variable the data is written in. For example, the request message in which the variable name "abc", an offset "4", and data "EFG" are designated is transmitted to the PLC 200, the data "EFG" is written at the position of 4 bytes from the head address of the data area of the variable "abc" in the memory of the PLC 200.

In any data type variable, the memory of the PLC 200 can basically be rewritten using the variable writing request. However, for the string type variable, because possibly the size of the data to be written exceeds a maximum size transmittable in one frame, the processing is performed multiple times while the variable writing request is divided depending on the data size. A procedure in this case will be described in detail below.

(Procedure to Rewrite String Type Variable)

Figure 3:
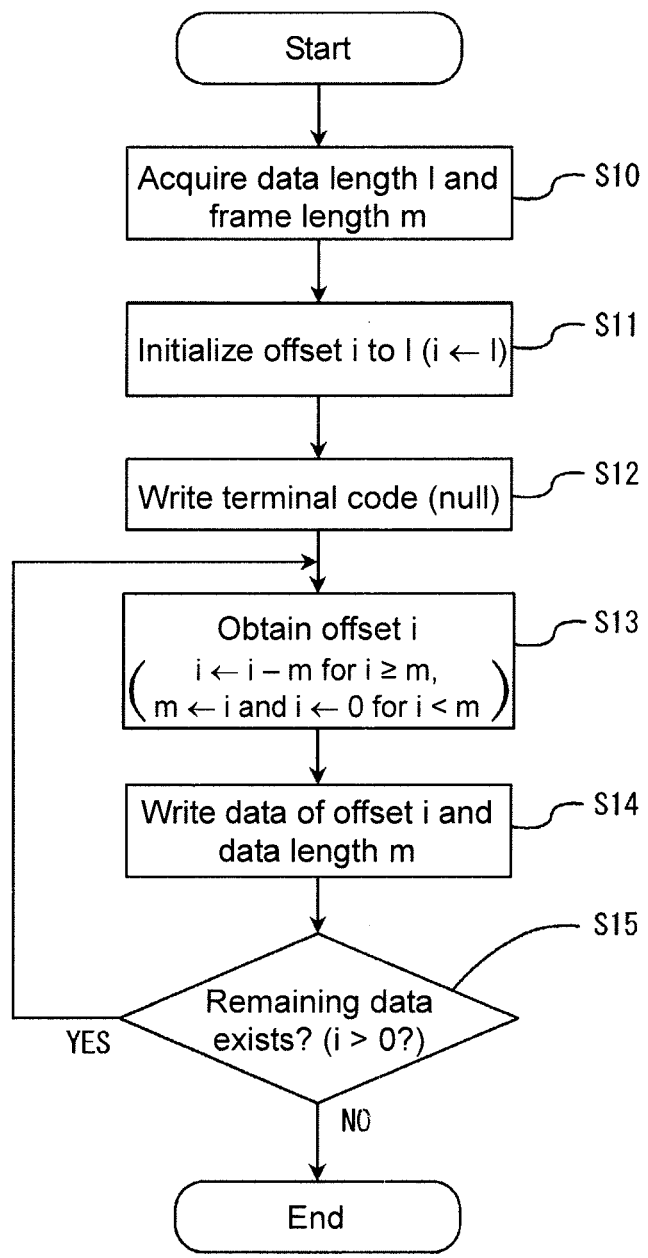
FIG. 3 is a flowchart of a procedure to rewrite a string type variable in an embodiment of the invention.

The procedure to rewrite the string type variable will be described with reference to FIGS. 3 and 4. FIG. 3 is a flowchart illustrating processing of the computer 100 when the data is transmitted using the plurality of frames. FIG. 4A illustrates the data written in the PLC 200, and FIG. 4B illustrates the frame transmitted from the computer 100 and a memory state of the PLC 200 in time series. The procedure to set the character string "ABCDEFG" to the variable "abc" is described by way of example. Like the example in FIG. 5, it is assumed that the maximum size transmittable in one frame is 5 bytes, it is assumed that 10 bytes are assigned as the data area of the variable "abc" to the memory of the PLC 200, and it is assumed that the character string "123456" is stored in an initial state.

The computer 100 acquires a data length l of the character string data to be written and a maximum size (frame length) m transmittable in one frame (Step S10), and the computer 100 initializes an offset i to l (Step S11). The initial value of i becomes 8 because of l=8 bytes and m=5 bytes in the example of FIG. 4.

The computer 100 writes a terminal code (null) in the head address of the data area of the rewriting target variable of the PLC 200 (before the actual character string data is written) (Step S12). Specifically, a frame having the offset "0" and the data "00 (null)" is generated as illustrated in FIG. 4B, and transmitted to the PLC 200. In response to the request, the PLC 200 writes null in the head address of the data area of the variable "abc".

After the data area of the PLC 200 is reset to null, the character string data is divided into a plurality of pieces of divided data of the maximum size or less, and the pieces of divided data are sequentially written from the end. Specifically, the value of the offset i is updated so as to be decremented by m (however, for i<m, m is substituted for i and o is substituted for i) (Step S13), the divided data of m bytes from an ith byte of the original character string data is written at the position of the ith byte from the head of the data area (Step S14). The pieces of processing in Steps S13 and S14 are repeated until all the pieces of data are written (Step S15). In the example of FIG. 4B, 5-byte data of the character code "DEFG" of the character string "ABCDEFG" and a null code is written at the position of the offset "3" in the second frame, and 3-byte data of the remaining character code "ABC" is written at the position of the offset "0" in the third frame.

According to the rewrite procedure, a state in which the null is set to the head address of the data area is maintained during a transition period of the data write, namely, until the write of the final divided data is completed since the null is initially written. Accordingly, even if the PLC 200 refers to the variable during the transition period, the PLC 200 recognizes that the variable is empty (the data is not set). For example, the operation of the control program of the PLC 200 is designed such that "for the empty variable, an abnormality is determined to be generated to output an error message" or such that "for the empty variable, the processing is performed using a default value", whereby abnormal operation (unintended operation) of the PLC 200 can be prevented.

The use of the rewrite procedure enlarges the data size of the variable on the PLC side compared with the conventional technology, and therefore applications of the variable can be widened to extend the function of the PLC. Some prospected usage will be described below by way of example.

In the case that the character string is printed on a package of a product, conventionally image data (binary data) is usually used. When the character string to be printed is changed according to a product or a lot, the image data of each pattern is previously prepared, and the character string is switched by designating an image ID or the like. When the upper limit size of the variable increases, the character string to be printed can be dealt with as the variable. In this case, maintenance is facilitated because the character string to be printed can be changed or added from an external computer or an HMI (Human Machine Interface). The extension in which conditions of a font, a character color, and character size are designated can be performed.

In the case that an error of the PLC is displayed on the external computer or the HMI, conventionally an error message (a warning statement or a descriptive statement) is generated on the computer or HMI side based on an error number acquired from the PLC. In this case, it is necessary for the computer or the HMI to have dictionary data in which the error number and the error message are associated with each other. When the upper limit size of the variable increases, the error message can be included as the variable in the PLC. Therefore, the system can flexibly be designed because the necessity of the dictionary data is eliminated in the computer or the HMI.

Sometimes production data is stored in a text file format in a memory card attached to the PLC. At this point, the character strings of a model, a lot number, and the like are previously set as the variable in the PLC. Similarly, sometimes an error log is recorded in the memory card, and the error message described in a log is also set as the variable in the PLC. On the other hand, a text file such as recipe information is read from the memory card and set in the PLC. Assuming that a multi-byte character (4 bytes) such as Chinese is dealt with, the conventional size (for example, 256 bytes) is not enough. On the other hand, the multi-byte character can easily be dealt with when the character string of several kilobytes can be processed like the embodiment.

The embodiment expressed only one specific example of the invention, but the invention is not limited to the embodiment. For example, the pieces of divided data are sequentially written from the end. However, the pieces of divided data except the head divided data may be written in any order as long as at least the head divided data is finally written. In the embodiment, the personal computer is cited as an example of the data setting device. Alternatively, the HMI or the computer in another PLC may act as the data setting device.

The invention claimed is:

1. A data setting device including a processor, the processor configured to rewrite a variable set in a PLC (Programmable Logic Controller) through a network, generate a frame, and cause the PLC to rewrite a rewriting target variable by transmitting the frame to the PLC, the frame indicating at least the rewriting target variable, an offset from a head address of a data area of the rewriting target variable, and data to be written at a position designated by the offset,
wherein, when the rewriting target variable is a variable-length data type variable terminated by a predetermined terminal code, and when a whole size of the data to be written in the variable exceeds a maximum size transmittable in one frame,
the processor further
divides the data to be written into a plurality of pieces of divided data of the maximum size or less to calculate the offset of each piece of divided data,
transmits a frame issuing an instruction to the PLC to write the predetermined terminal code in the head address of the data area,
transmits a frame issuing an instruction to the PLC to write the divided data at a position of the corresponding offset from the head address of the data area with respect to the divided data except a head divided data, and
transmits a frame issuing an instruction to the PLC to write the head divided data in the head address of the data area.

2. The data setting device according to claim 1, wherein the processor rewrites the variable during operation of the PLC.

3. The data setting device according to claim 1, wherein the variable is a character string type variable terminated by a null code.

4. The data setting device according to claim 1, wherein the network is an industrial network, and a protocol used to transmit the frame is a protocol comprising no fragmentation mechanism.

5. A data setting method of rewriting a variable set in a PLC (Programmable Logic Controller) through a network from an external computer, the external computer generating a frame and causing the PLC to rewrite a rewriting target variable by transmitting the frame to the PLC, the frame indicating at least the rewriting target variable, an offset from a head address of a data area of the rewriting target variable, and data to be written at a position designated by the offset, wherein
when the rewriting target variable is a variable-length data type variable terminated by a predetermined terminal code, and when a whole size of the data to be written in the variable exceeds a maximum size transmittable in one frame,
the external computer performs:
dividing the data to be written into a plurality of pieces of divided data of the maximum size or less to calculate the offset of each piece of divided data;
transmitting, by a first writing, a frame issuing an instruction to the PLC to write the predetermined terminal code in the head address of the data area;
transmitting, by a second writing after the first writing, a frame issuing an instruction to the PLC to write the divided data at a position of the corresponding offset from the head address of the data area with respect to the divided data except a head divided data; and
transmitting, by a third writing after the second writing, a frame issuing an instruction to the PLC to write the head divided data in the head address of the data area.

6. A program stored in a non-transitory computer readable storage medium and configured to cause a computer to perform the data setting method according to claim 5.

7. A non-transitory computer-readable storage medium in which the program according to claim 6 is stored.

8. The data setting device according to claim 2, wherein the variable is a character string type variable terminated by a null code.

9. The data setting device according to claim 2, wherein the network is an industrial network, and a protocol used to transmit the frame is a protocol comprising no fragmentation mechanism.

10. The data setting device according to claim 3, wherein the network is an industrial network, and a protocol used to transmit the frame is a protocol comprising no fragmentation mechanism.

* * * * *